(12) United States Patent
Chen et al.

(10) Patent No.: US 8,676,881 B2
(45) Date of Patent: Mar. 18, 2014

(54) LOCATION UPDATE METHOD, HETEROGENEOUS NETWORK COMMUNICATIONS SYSTEM AND DEVICE

(75) Inventors: Haiyong Chen, Shenzhen (CN); Bin Shen, Shenzen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 12/951,661

(22) Filed: Nov. 22, 2010

(65) Prior Publication Data

US 2011/0072068 A1     Mar. 24, 2011

Related U.S. Application Data

(63) Continuation of application No. PCT/CN2009/071897, filed on May 21, 2009.

(30) Foreign Application Priority Data

May 21, 2008    (CN) .......................... 2008 1 0108618

(51) Int. Cl.
 *G06F 15/16* (2006.01)
(52) U.S. Cl.
 USPC ........ 709/202; 709/203; 370/310.2; 370/335; 370/350; 455/404.2; 455/456.6; 455/457
(58) Field of Classification Search
 None
 See application file for complete search history.

(56) References Cited

U.S. PATENT DOCUMENTS

| | | | |
|---|---|---|---|
| 6,625,461 B1 * | 9/2003 | Bertacchi | 455/466 |
| 2003/0025959 A1 * | 2/2003 | Nagarajan et al. | 359/117 |
| 2005/0227705 A1 * | 10/2005 | Rousu et al. | 455/456.1 |
| 2007/0140185 A1 | 6/2007 | Garg et al. | |
| 2007/0160034 A1 | 7/2007 | Koretsky | |
| 2007/0218871 A1 | 9/2007 | Bonner | |
| 2008/0045178 A1 * | 2/2008 | Venkatachalam | 455/404.2 |

FOREIGN PATENT DOCUMENTS

| | | |
|---|---|---|
| CN | 101060711 A | 10/2007 |
| CN | 101076171 A | 11/2007 |
| CN | 101094500 A | 12/2007 |
| CN | 101123536 A | 2/2008 |
| WO | WO2009140924 A1 | 11/2009 |

OTHER PUBLICATIONS

Behcet Sarikaya(Huawei), Multi-Radio Power Management, Sep. 2007, IEEE, <http://www.ieee802.org/21/> // Power Point presentation.*

(Continued)

*Primary Examiner* — Jeffrey M Rutkowski
*Assistant Examiner* — Hardikkumar Patel
(74) *Attorney, Agent, or Firm* — Brinks Gilson & Lione (57) ABSTRACT

A location update method, and a heterogeneous network communications system and a device are provided herein. The method includes: an information server receives a location update request message from a multimode terminal; the information server searches the pre-stored location area mapping information for the location area information of the second interface; and the information server sends the location update request message of the second interface to a second Paging Coordinator (PC) corresponding to the second interface, where the request message carries the found location area information of the second interface so that the second PC can update existing location area information of the second interface. The system includes an information server, a first PC and a second PC. Therefore, the interfaces of the multimode terminal do not need to initiate location update frequently, message interactions between the terminal and the network are reduced, and not all interfaces of the multimode terminal need to report location area information, thus saving power.

14 Claims, 5 Drawing Sheets

(56) References Cited

OTHER PUBLICATIONS

Muthiah Venkatachalam, Media Independent Idle Mode and Paging, May 2006, IEEE, <http://www.ieee802.org/21/> // Power Point presentation.*

First Chinese Office Action dated (mailed) Mar. 23, 2011, issued in related Chinese Application No. 200810108618.4 Huawei Technologies Co., Ltd.

Written Opinion of the International Searching Authority (translation) dated (mailed) Aug. 27, 2009, issued in related Application No. PCT/CN2009/071897, filed May 21, 2009, Huawei Technologies Co., Ltd.

International Search Report for International Application No. PCT/CN2009/071897, mailed Aug. 27, 2009 Huawei Technologies Co., Ltd.

"Multi-Radio PM Draft Technical Requirements," IEEE 802.21 MIHS http://www.ieee802.org/21/ Jan. 2008.

"Draft Standard for Local and Metropolitan Area Networks: Media Independent Handover Services," IEEE P802.21/D9.1, Mar. 2008.

Second Chinese Office Action dated (mailed) Feb. 13, 2012, issued in related Chinese Application No. 200810108618.4 Huawei Technologies Co., Ltd (6 pgs.).

\* cited by examiner

LOCATION UPDATE METHOD, HETEROGENEOUS NETWORK COMMUNICATIONS SYSTEM AND DEVICE

CROSS-REFERENCE TO RELATED APPLICATIONS

This application is a continuation of International Application Ser. No. PCT/CN2009/071897, filed on May 21, 2009, which claims priority to Chinese Patent Application No. 200810108618.4, filed on May 21, 2008, both of which are hereby incorporated by reference in their entireties.

FIELD OF THE INVENTION

The present invention relates to a location update technology in the field of mobile communication, and in particular, to a location update method, and a heterogeneous network communications system and a device that can implement the location update method.

BACKGROUND OF THE INVENTION

The Media Independent Handover (MIH) technology is designed to implement seamless handover between different networks and improve the user experience. The MIH technology enables handover between different link-layer access technologies. A uniform interface is provided on the basis of different access technologies to obtain a trigger event and other information for implementing handover between different network access technologies.

For the purpose of updating the location of a multimode terminal applied in a heterogeneous network in the prior art, all interfaces of the multimode terminal based on different access technologies need to undergo the location update process. The location update in the prior art is to update the locations of other interfaces through the currently enabled interface of the multimode terminal. For example, a multimode terminal may update the location of the Worldwide Interoperability for Microwave Access (WiMAX) interface through a Wireless Fidelity (WiFi) interface. The location update process is as follows:

The multimode terminal encapsulates the WiMAX location update request into a WiFi location update request message. Through a Paging Agent (PA) of the WiFi network, the message is sent to a Paging Coordinator (PC) of the WiFi network. After receiving this message, the PC of the WiFi network forwards the WiMAX location update request in the message to the PC of the WiMAX network. The PC of the WiMAX network sends a WiMAX location update response message to the PC of the WiFi network. The PC of the WiFi network encapsulates the received WiMAX paging response message into a WiFi location update response message, and sends it to the multimode terminal through the PA of the WiFi network, and thus location update is implemented for the WiFi interface and the WiMAX interface.

It can be seen from the above description that, in the location update mode in the prior art, every interface of the multimode terminal needs to detect its own location information, and initiate location update periodically for every access technology, which leads to too frequent information interactions at the network side and increases the load of the system and the power consumption of the multimode terminal.

SUMMARY OF THE INVENTION

Embodiments of the present invention provide a location update method that can update locations of all interfaces by reporting location information of one interface only. The method reduces network-side information interactions, and saves power because not all interfaces of the multimode terminal need to report location area information.

An embodiment of the present invention provides a location update method, including:

receiving, by an information server, a location update request message of a first interface from a multimode terminal, where the request message is sent through the enabled first interface and carries a location update request of a second interface of the multimode terminal and location area information of the first interface;

searching pre-stored location area mapping information for location area information of the second interface according to the received location area information of the first interface; and sending a location update request message of the second interface to a second PC of a second access network corresponding to the second interface, where the request message carries the found location area information of the second interface so that the second PC can update the existing location area information of the second interface.

An embodiment of the present invention provides a heterogeneous network communications system, including:

an information server, connected to a first PC and a second PC, and configured to: search for location area information of a second interface of a multimode terminal according to location area information of a first interface of the multimode terminal, and send a location update request message of the second interface to the second PC;

the first PC, configured to: add location update result information of the second interface from the information server to a location update response message which is to be sent to the first interface, and send the location update response message to the multimode terminal; and the second PC, configured to update the existing location area information of the second interface according to the location area information of the second interface from the information server.

An embodiment of the present invention provides an information server, including:

a first information module, configured to store location area mapping information;

a second information module, configured to search the location area mapping information stored in the first information module for location area information of a second interface of a multimode terminal according to location area information of a first interface in a received location update request message of the first interface after receiving the request message from the multimode terminal;

a third information module, configured to s end a location update request message of the second interface to a second PC, where the request message carries the found location area information of the second interface so that the second PC can update the existing location area information of the second interface; and a fourth information module, configured to send location update result information of the second interface to the first PC after receiving a location update response message of the second interface.

An embodiment of the present invention provides a first PC, including:

a first updating module, configured to update existing location area information of a first interface according to location area information sent by a multimode terminal through the enabled first interface; and a first responding module, configured to: add location update result information of a second interface from an information server to a location update response message which is to be sent to the first interface, and send the location update response message to the multimode terminal.

An embodiment of the present invention provides a second PC, including:

a second updating module, configured to update existing location area information of a second interface according to location area information of the second interface from an information server; and a second responding module, configured to return a location update response message of the second interface to the information server after the second updating module finishes the update.

In the embodiments of the present invention, location area mapping information of various access networks in a wireless access area is pre-stored in an information server, and the locations of all interfaces of a multimode terminal can be updated after one location update request is sent through one interface of the multimode terminal. Therefore, the interfaces of the multimode terminal do not need to initiate location update frequently, message interactions between the terminal and the network are reduced, and not all interfaces of the multimode terminal need to report location area information, and this saves power. Moreover, in the process of implementing the embodiments of the present invention, the PCs of each access network need to be connected to the information server only, and do not need to be interconnected with each other, and this simplifies the networking.

The technical solution under the present invention is detailed below with reference to accompanying drawings and exemplary embodiments.

DETAILED DESCRIPTION OF THE EMBODIMENTS

Method Embodiment 1

Figure 1:
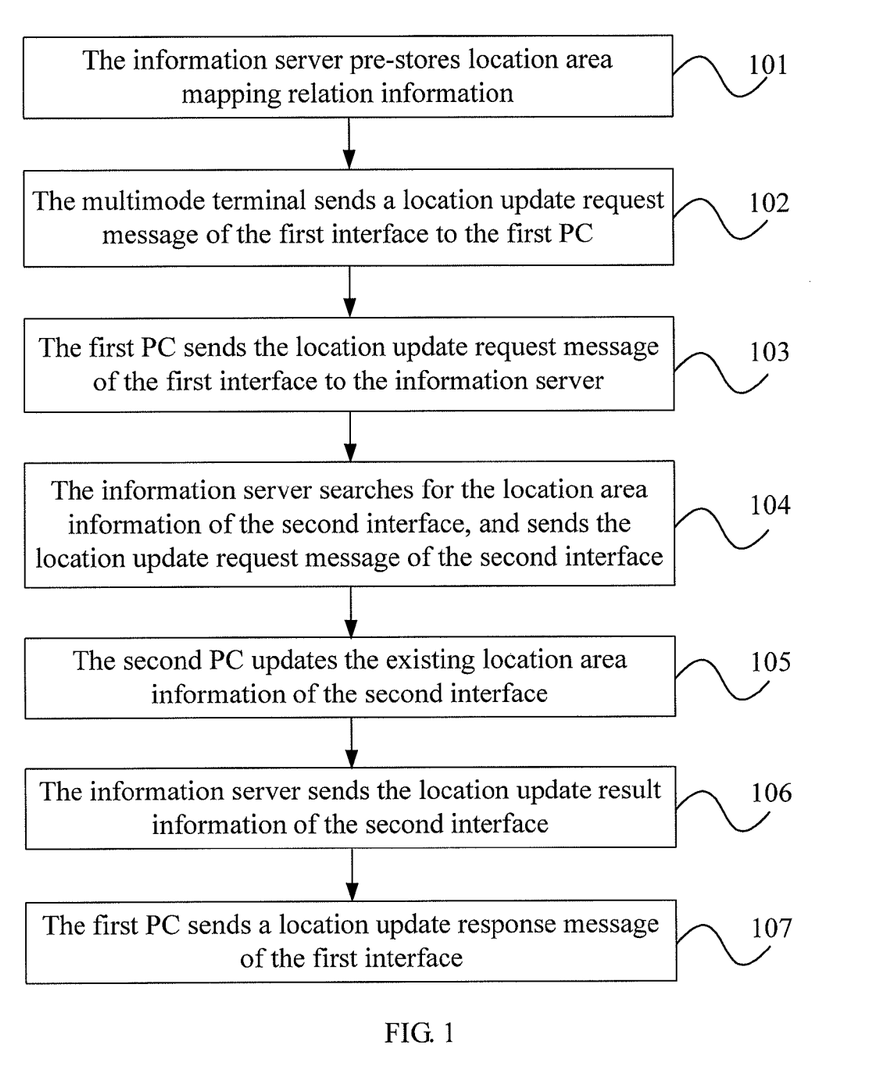
FIG. 1 is a flowchart of a location update method according to a first embodiment of the present invention.

This embodiment provides a location update method. As shown in FIG. 1, the method includes the following steps:

Step 101: Location area mapping information of all access networks is pre-stored in an information server.

Figure 2:
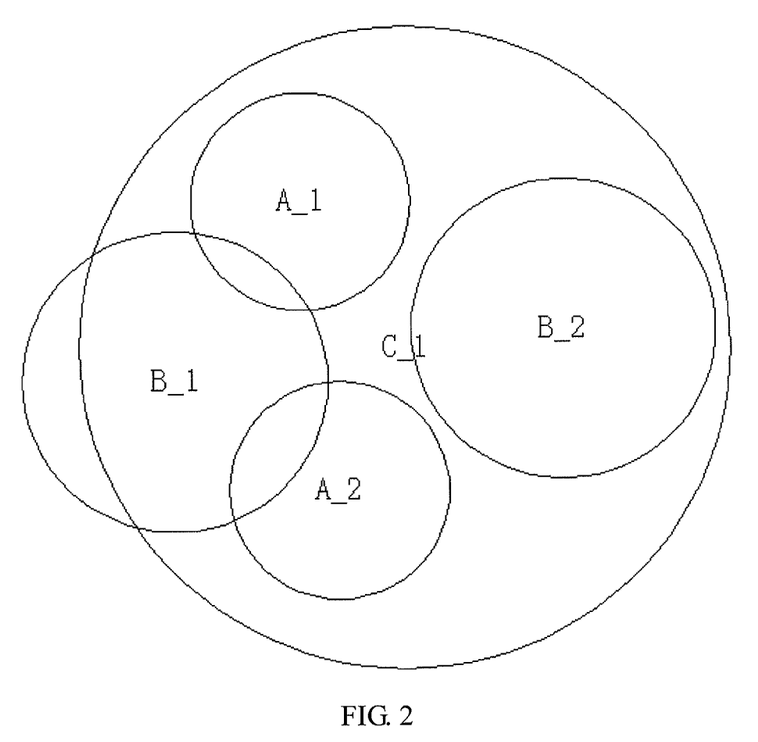
FIG. 2 shows location area relations when three access networks A, B, and C coexist in a wireless access area according to the first embodiment of the present invention.

For example, as shown in FIG. 2, three access networks A, B, and C coexist in a wireless access area. Access network A includes location area A_1 and location area A_2; access network B includes location area B_1 and location area B_2; access network C includes location area C_1. An overlapped wireless access area exists in the coverage of the location areas of different access networks. Based on the three access networks above, according to the intersection between the location areas, the mapping is shown in Table 1:

TABLE 1

| Location Area Reported by Enabled Interface | Location Area Mapped to Access Network A | Location Area Mapped to Access Network B | Location Area Mapped to Access Network C |
|---|---|---|---|
| A_1 |  | B_1 | C_1 |
| A_2 |  | B_1 | C_1 |
| B_1 | (A_1, A_2) |  | C_1 |
| B_2 | None |  | C_1 |
| C_1 | (A_1, A_2) | (B_1, B_2) |  |

Such a relation is not necessarily a one-to-one mapping. The location area mapping may be expressed through the following formula:

Supposing that Area 1, Area 2, . . . , Area n is a complete set of wireless access areas covered by all types of networks currently, and that AREA is location area information reported by the currently enabled interface, as regards a random network type N, the location area information (expressed as Area_N) mapped from AREA on the network side of N is:

$$Area\_N = \cup Area_i,$$

where: $Area_i \in N$, and $Area_i \cap AREA \neq \emptyset$

In the formula above, "$\cup$" refers to obtaining a union, "$\cap$" refers to obtaining an intersection, and "$\emptyset$" refers to an empty set.

The formula above indicates that: The location area information (Area_N) in network N mapped from the location area information reported by the currently enabled interface is the sum of the location area information of all location areas that are intersected by the currently reported location area information and all location area information in network N. For example, in FIG. 2 it is assumed that the current location area is B_1, and that the sum of the location areas intersected by B_1 in network A is A_1 and A_2. More specifically, the information server may be a Multi-Radio Power conservation Management enabled Information Server (MRPM IS), which provides information about power conservation management for the entity capable of managing power conservation of multiple radio interfaces. Power management is an important commitment in the IEEE802.21 standard. First, in a heterogeneous network, a mobile terminal maintains information of various access networks, and the terminal consumes power massively, and the power consumption increases with the increase of access networks; second, the power consumption varies between different access networks, for example, the power consumption of a WiFi network is greater than that of a WiMAX network and that of a 3rd Generation Partnership Project (3GPP) network. Therefore, in a heterogeneous network, power is managed in view of power consumption differences between different networks, and the paging or data transmission is performed through the interface that consumes low power. In this way, power is saved.

Step 102: Through the first interface enabled on the multimode terminal, the multimode terminal sends a location update request message of the first interface to the first PC of the first access network corresponding to the first interface. The request message carries a location update request of the second interface of the multimode terminal, and carries the location area information of the first interface.

The first interface is the interface currently enabled on the multimode terminal. After this interface is enabled, it may be in an Active state or an Idle state or a Sleep state. Specifically, based on a power saving rule, the interface with the least power consumption is enabled and taken as the first interface;

or, based on a service rule, the interface currently processing a service is taken as the first interface. All interfaces except the first interface are disabled. The location area information of the first interface is the information about the location area of the multimode terminal in the first access network corresponding to the first interface.

It should be noted that, the second interface above is an interface other than the first interface on the multimode terminal. In practice, the second interface may be one or more interfaces. Accordingly, the second access network corresponding to the second interface may be one or more access networks.

Specifically, the multimode terminal may send the location update request message of the first interface to the first Paging Agent, PA, of the first access network, and the first PA forwards the request message to the first PC.

Step 103: The first PC sends the location update request message of the first interface to the information server. The information server may be an MRPM IS server.

Specifically, the first PC may update the location area information of the first interface already stored in the first PC according to the received location area information of the first interface, and detect whether the location update request message of the first interface carries a location update request of the second interface. If the location update request message of the first interface carries a location update request of the second interface, the first PC sends the location update request message of the first interface to the information server; if the location update request message of the first interface does not carry a location update request of the second interface, it indicates that the first interface does not need to update locations of other interfaces, and according to the location update process in the prior art, the first PC performs the location update for the first interface only.

Step 104: After receiving the location update request message of the first interface, the information server searches the pre-stored location area mapping information for the location area information of the second interface according to location area information of the first interface in the request message; and sends a location update request message of the second interface to the second PC of the second access network, where the request message carries the found location area information of the second interface.

Step 105: After receiving the location update request message of the second interface, the second PC updates the existing location area information of the second interface according to location area information of the second interface in the request message, and returns a location update response message of the second interface to the information server.

Step 106: The information server sends location update result information of the second interface to the first PC after receiving the location update response message of the second interface.

Step 107: The first PC adds the location update result information of the second interface from the information server to a location update response message of the first interface, and sends the response message to the multimode terminal through the first access network. Specifically, the response message may be forwarded to the multimode terminal through the first PA.

So far, all interfaces on the multimode terminal have finished location update. If the location area of the multimode terminal keeps unchanged, the second interface will not request location update any more.

Through the method provided in this embodiment, location area mapping information of various access networks in a wireless access area is pre-stored in an information server, so the locations of all interfaces of a multimode terminal can be updated after one location update request is sent through one interface of the multimode terminal. Therefore, the interfaces of the multimode terminal do not need to initiate location update frequently, message interactions between the terminal and the network are reduced, and not all interfaces of the multimode terminal need to report location area information, and this saves power. Moreover, in the process of implementing this embodiment, the PCs of each access network need to be connected to the information server only, and do not need to be interconnected with each other, and this simplifies the networking.

Method Embodiment 2

Figure 3:
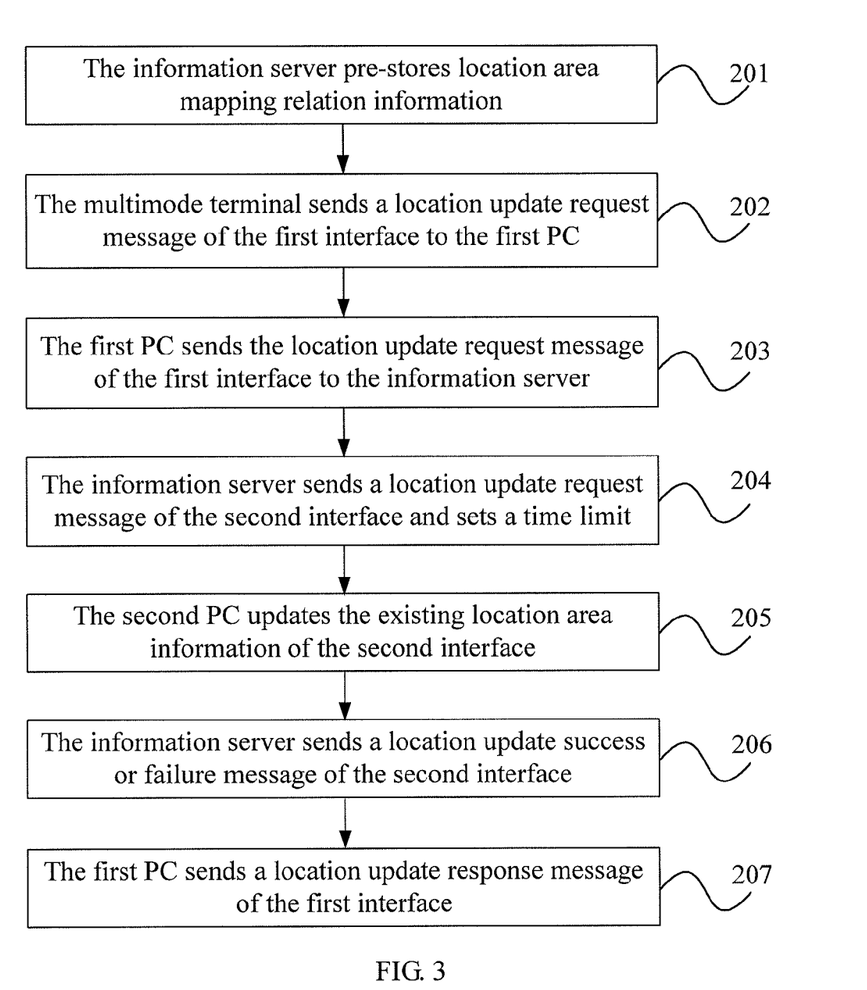
FIG. 3 is a flowchart of a location update method according to a second embodiment of the present invention.

This embodiment provides another location update method. As shown in FIG. 3, the method includes the following steps:

Steps 201-203 in this embodiment are the same as steps 101-103 in the first embodiment.

Step 204: Similarly to step 104, the information server searches the pre-stored location area mapping information for the location area information of the second interface according to the location area information of the first interface in the location update request message of the first interface after receiving the request message. The difference lies in that: Taking factors such as the possibility of location update failure into account, after the information server sends the location update request message of the second interface to the second PC of the second access network, the information server starts a timer which sets a time limit, so as to control the time for receiving from interfaces B and C a response to the location update request message.

Step 205 is the same as step 105.

Step 206: If the information server receives a location update response message of the second interface within the set time limit, the information server sends a location update success message of the second interface to the first PC; or, if the information server does not receive a location update response message of the second interface within the set time limit, the information server sends a location update failure message of the second interface to the first PC.

Step 207: The first PC adds the location update success or failure message of the second interface from the information server to a location update response message of the first interface, and sends the response message to the multimode terminal through the first access network. Specifically, the response message may be forwarded to the multimode terminal through the first PA.

The second interface of the multimode terminal knows whether the location of the second interface is updated successfully according to the response message received by the first interface. If the location of the second interface is updated successfully, the second interface stops requesting location update if the multimode terminal does not change its location; otherwise, the foregoing steps are repeated, or the second interface initiates an independent location update process of the second interface.

Figure 4:
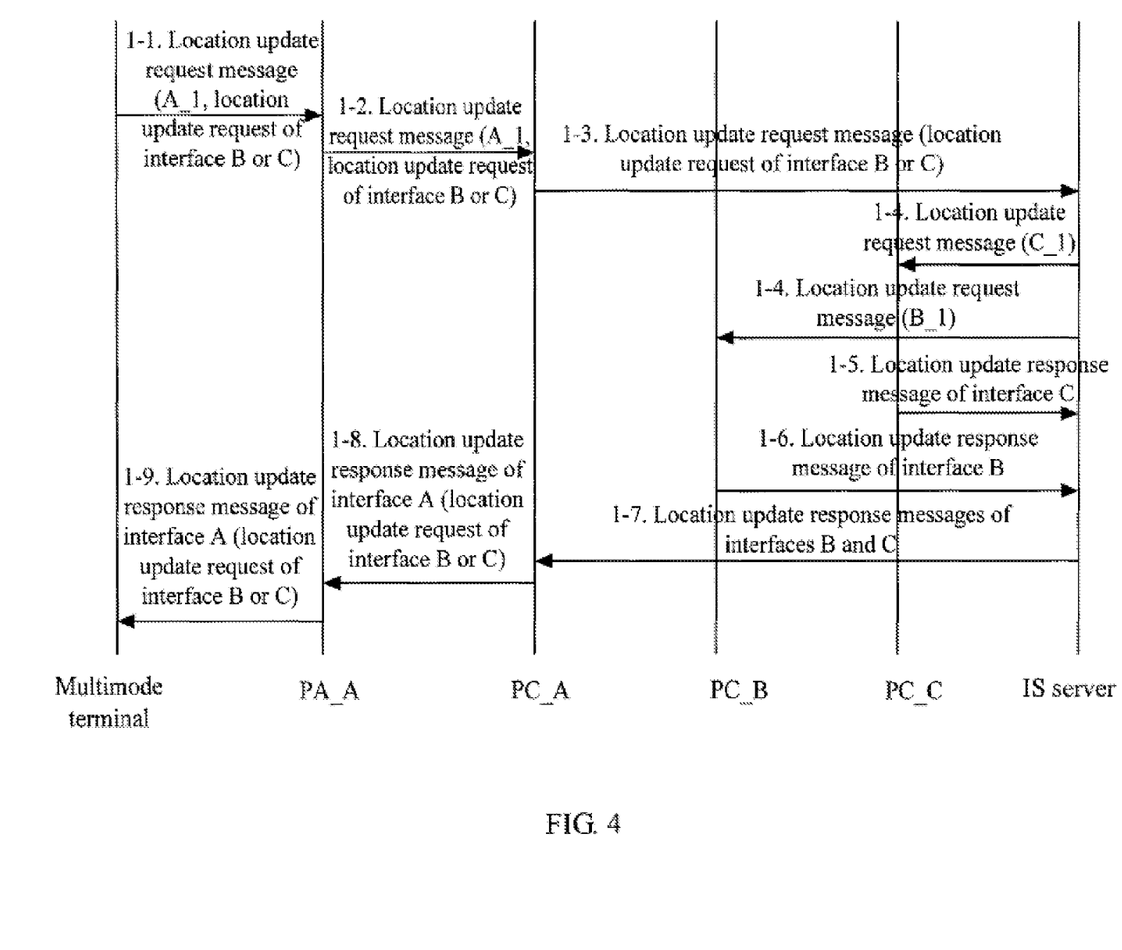
FIG. 4 is a signaling flowchart of a location update method according to the second embodiment of the present invention.

It is assumed that in a wireless access area, the multimode terminal has interface A corresponding to access network A, interface B corresponding to access network B, and interface C corresponding to access network C. As shown in FIG. 4, taking that interface A is enabled as an example, the signaling flow of the location update method in this embodiment includes the following steps:

1-1: Interface A sends a location update request message of interface A to PA_A (namely, the PA of access network A). The request message carries location update requests of interface B and interface C, and carries location area information of interface A. It is assumed that the location area of interface A is A_1.

1-2: PA_A forwards the received location update request message of interface A to PC_A (namely, the PC of access network A).

1-3: PC_A updates the location area information of interface A already stored in PC_A according to the received location area information of interface A, and detects whether the location update request message of interface A carries a location update request of interface B or C. If the location update request message of interface A carries the location update request, PC_A sends the location update request to an MRPM IS server; otherwise, it indicates that interface A does not need to update the location of interface B or C, and PC_A performs the location update only for interface A according to the location update process in the prior art.

1-4: After the MRPM IS server receives the location update request message of interface A, the MRPM IS server searches the location area mapping information shown in Table 1 according to the location area information (namely, location area A_1) carried in the request message, and finds that the location area A_1 is mapped to location area B_1 in access network B, and is mapped to location area C_1 in access network C. Further, the MRPM IS server sends a location update request message of interface B to PC_B (namely, the PC of access network B). The request message carries the location area information (namely, location area B_1) corresponding to the multimode terminal in access network B. Further, the MRPM IS server sends a location update request message of interface C to PC_C (namely, the PC of access network C). The request message carries the location area information (namely, location area C_1) corresponding to the multimode terminal in access network C.

It should be noted that the location update request messages sent to PC_B and PC_C may be sent simultaneously or sequentially. Taking factors such as the possibility of location update failure into account, after sending the update request message, the MRPM IS server may start a timer which sets a time limit, so as to control the time for receiving from interfaces B and C a response to the location update request message.

1-5: After receiving the location update request, PC_C (namely, the PC of access network C) updates the existing location area information of interface C stored on PC_C, namely, updates it to location area C_1, and returns a location update response of interface C to the MRPM IS server.

1-6: After receiving the location update request, PC_B (namely, the PC of access network B) updates the existing location area information of interface B stored on PC_B, namely, updates it to location area B_1, and returns a location update response of interface B to the MRPM IS server.

Step 1-5 and step 1-6 may occur simultaneously or sequentially, and there is no sequence between them.

1-7: The MRPM IS server receives the location update response within the time limit set by the timer. After receiving the location update responses of interface B and interface C, the MRPM IS server stops the timer and sends location update result information of interface B and interface C to PC_A (namely, the PC of access network A). The result information indicates whether the location update of interface B or C succeeds or fails. If the location update fails, the result information may further carry causes for the failure.

1-8: PC_A adds the location update result information from the MRPM IS server to a location update response message of interface A, and sends the response message to PA_A through access network A.

1-9: PA_A sends the location update response message from PC_A to the multimode terminal through interface A.

An additional merit of the method in this embodiment is: The information server sets a time limit for monitoring whether the second PC updates the location of the second interface successfully, which overcomes the following problem: The information server keeps waiting due to causes such as location update failure caused by a transmission error or overload of the second PC. As a result, the system is more efficient and reliable.

System Embodiment

Figure 5:
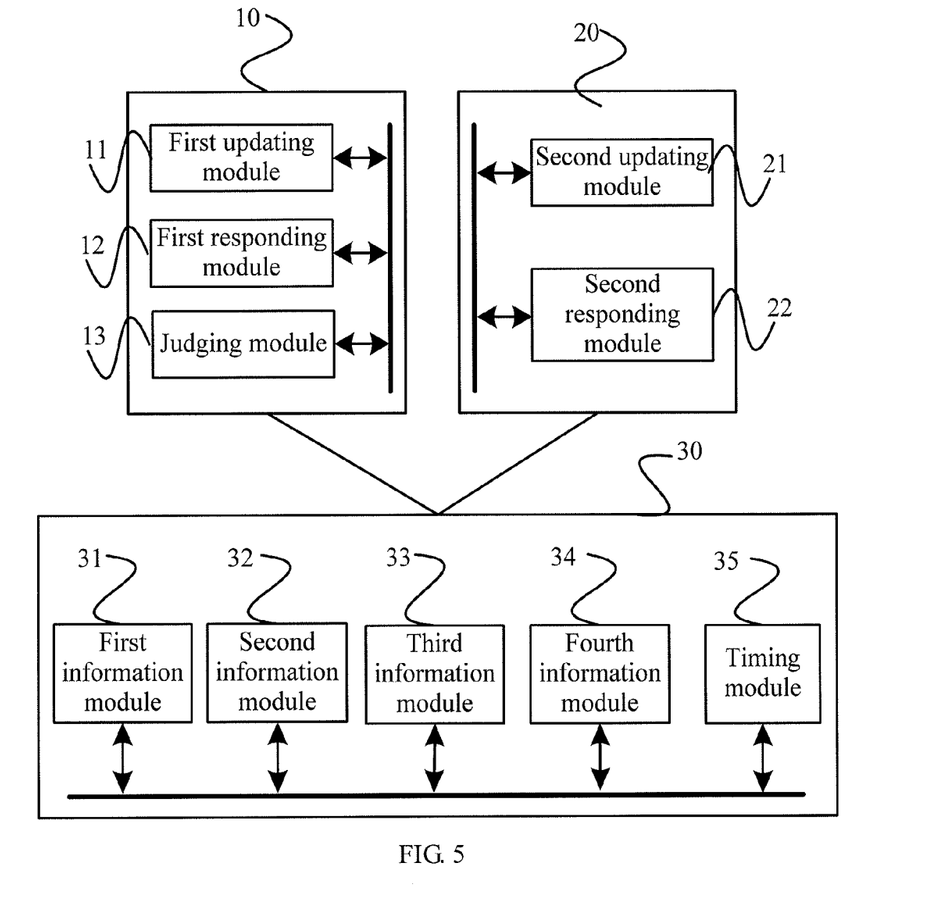
FIG. 5 shows the structure of a heterogeneous network communications system according to an embodiment of the present invention.

An embodiment of the present invention provides a heterogeneous network communications system, applied in a heterogeneous network with overlapped coverage of diverse access networks. As shown in FIG. 5, the system includes:

an information server 30, connected to a first PC 10 and a second PC 20, and configured to: search for location area information of a second interface of a multimode terminal according to location area information of a first interface from the multimode terminal, and send a location update request message of the second interface to the second PC 20;

the first PC 10, configured to: add location update result information of the second interface from the information server to a location update response message which is to be sent to the first interface, and send the location update response message to the multimode terminal; and the second PC 20, configured to update the existing location area information of the second interface according to the location area information of the second interface from the information server.

Further, the information server 30 includes:

a first information module 31, configured to store location area mapping information;

a second information module 32, configured to search the location area mapping information stored in the first information module for location area information of a second interface of a multimode terminal according to location area information of a first interface in a received location update request message of the first interface after receiving the request message from the multimode terminal;

a third information module 33, configured to send a location update request message of the second interface to a second PC 20, where the request message carries the found location area information of the second interface so that the second PC can update the existing location area information of the second interface; and a fourth information module 34, configured to send location update result information of the second interface to the first PC 10 after receiving a location update response message of the second interface.

The first PC 10 includes:

a first updating module 11, configured to update existing location area information of a first interface according to location area information of the first interface from a multimode terminal; and a first responding module 12, configured to: add location update result information of a second interface from the information server 30 to a location update response message which is to be sent to the first interface, and send the location update response message to the multimode terminal.

The second PC 20 includes:

a second updating module 21, configured to update existing location area information of a second interface according to location area information of the second interface from the information server 30; and a second responding module 22, configured to return a location update response message of the second interface to the information server 30 after the second updating module 21 finishes the update.

The working process is as follows:

Through the first interface enabled on the multimode terminal, the multimode terminal (not illustrated in the figure) in the heterogeneous network sends a location update request message of the first interface to the first PC 10 of the first access network corresponding to the first interface. The request message carries a location update request of the second interface of the multimode terminal, and carries the location area information of the first interface.

Specifically, the first PC 10 may further include a judging module 13, configured to: judge whether the location update request message of the first interface carries a location update request of the second interface after receiving the location update request message of the first interface from the multimode terminal; and, if the location update request message of the first interface carries a location update request of the second interface, send the location update request message of the first interface to the information server 30.

The first information module 31 in the information server 30 stores the location area mapping information, as exemplified in Table 1. The second information module 32 searches the location area mapping information stored in the first information module 31 for location area information of the second interface of the multimode terminal according to location area information of the first interface in the received location update request message of the first interface after receiving the request message from the multimode terminal. The third information module 33 sends a location update request message of the second interface to the second PC 20, where the request message carries the found location area information of the second interface so that the second PC 20 can update the existing location area information of the second interface.

The second updating module 21 of the second PC 20 updates existing location area information of the second interface according to location area information of the second interface from the information server 30. After completion of the update, the second responding module 22 returns a location update response message of the second interface to the information server 30.

The fourth information module 34 of the information server 30 sends location update result information of the second interface to the first PC 10 after receiving a location update response message of the second interface from the second PC 20.

Specifically, the information server 30 may further include a timing module 35, which is configured to set a time limit after the information server 30 sends the location update request message of the second interface to the second PC 20. The information server 30 sends a location update success message of the second interface to the first PC 10 if receiving a location update response message of the second interface within the time limit; or sends a location update failure message of the second interface to the first PC 10 if not receiving a location update response message of the second interface within the time limit.

The first updating module 11 of the first PC 10 updates existing location area information of the first interface according to location area information of the first interface from the multimode terminal; and the first responding module 12 adds location update result information of the second interface from the information server 30 to a location update response message which is to be sent to the first interface, and sends the location update response message to the multimode terminal. In this way, the process of updating the locations of the first interface and the second interface of the multimode terminal is completed.

Through the system provided in this embodiment, location area mapping information of various access networks in a wireless access area is pre-stored in an information server, and the locations of all interfaces of a multimode terminal can be updated after one location update request is sent through one interface of the multimode terminal. Therefore, the interfaces of the multimode terminal do not need to initiate location update frequently, message interactions between the terminal and the network are reduced, and not all interfaces of the multimode terminal need to report location area information, and this savings power. Moreover, in the process of implementing this embodiment, the PCs of each access network need to be connected to the information server only, and do not need to be interconnected with each other, and this simplifies the networking.

Persons of ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A location update method, comprising:
    storing pre-stored location area mapping information for a plurality of access networks in an information server;
    receiving, by the information server, a location update request message of a first interface from a multimode terminal, wherein the request message is sent through the enabled first interface and carries a location update request of a second interface of the multimode terminal and location area information of the first interface;
    searching pre-stored location area mapping information for location area information of the second interface according to the received location area information of the first interface;
    sending a location update request message of the second interface to a second Paging Coordinator (PC) of a second access network corresponding to the second interface, wherein the request message carries the found location area information of the second interface so that the second PC can update existing location area information of the second interface; and
    updating the first interface and the second interface of the multimode terminal after either the location update request message of the first interface or the location update request message of the second interface is received.

2. The location update method according to claim 1, wherein the step of the multimode terminal sending the location update request message of the first interface through the enabled first interface comprises:
- sending the location update request message of the first interface to a first PC of a first access network corresponding to the first interface; and
- sending, by the first PC, the location update request message of the first interface to the information server.

3. The location update method according to claim 2, wherein the step of the first PC sending the location update request message of the first interface to the information server comprises;
- judging, by the first PC, whether the location update request message of the first interface carries the location update request of the second interface after receiving the location update request message of the first interface; and
- sending the location update request message of the first interface to the information server if determining that the location update request message of the first interface carries the location update request of the second interface.

4. The location update method according to claim 2, wherein after the first PC receives the location update request message of the first interface, the method further comprises:
- updating existing location area information of the first interface according to the location area information of the first interface in the location update request message of the first interface.

5. The location update method according to claim 3, wherein after the first PC receives the location update request message of the first interface, the method further comprises:
- updating existing location area information of the first interface according to the location area information of the first interface in the location update request message of the first interface.

6. The location update method according to claim 1, wherein after updating the existing location area information of the second interface, the method further comprises:
- returning a location update response message of the second interface to the information server; and
- sending, by the information server, location update result information of the second interface to the multimode terminal after receiving the location update response message of the second interface.

7. The location update method according to claim 6, wherein the step of sending the location update result information of the second interface to the multimode terminal comprises:
- sending the location update result information of the second interface to a first PC; and
- adding, by the first PC, the received location update result information of the second interface to a location update response message which is to be sent to the first interface, and sending the location update response message to the multimode terminal.

8. The location update method according to claim 7, wherein the step of sending the location update response message which is to be sent to the first interface to the multimode terminal comprises:
- sending the location update response message which is to be sent to the first interface to a first Paging Agent (PA) of a first access network; and
- forwarding, by the first PA, the location update response message which is to be sent to the first interface to the multimode terminal.

9. The location update method according to claim 6, wherein the step of sending the location update result information of the second interface to the multimode terminal comprises:
- sending a location update success message of the second interface to the multimode terminal if the information server receives the location update response message of the second interface within a set time limit; or
- sending a location update failure message of the second interface to the multimode terminal if the information server does not receive a location update response message of the second interface within the set time limit.

10. The location update method according to claim 2, wherein the step of sending the location update request message of the first interface to the first PC comprises:
- sending the location update request message of the first interface to a first Paging Agent (PA) of the first access network; and
- forwarding, by the first PA, the location update request message of the first interface to the first PC.

11. A heterogeneous network communications system, comprising:
- an information server, connected to a first Paging Coordinator (PC) and a second PC, and configured to: store pre-stored location area mapping information for a plurality of access networks in the information server, search for location area information of a second interface of a multimode terminal according to location area information of a first interface from the multimode terminal, send a location update request message of the second interface to the second PC, and update the first interface and the second interface of the multimode terminal after either the location update request message of the first interface or the location update request message of the second interface is received;
- the first PC, configured to: add location update result information of the second interface from the information server to a location update response message which is to be sent to the first interface, and send the location update response message to the multimode terminal; and
- the second PC, configured to update existing location area information of the second interface according to the location area information of the second interface from the information server.

12. An information server, comprising:
- a first information module, configured to store pre-stored location area mapping information for a plurality of access networks in the information server;
- a second information module, configured to search the pre-stored location area mapping information stored in the first information module for location area information of a second interface of a multimode terminal according to location area information of a first interface in a received location update request message of the first interface after receiving the request message from the multimode terminal;
- a third information module, configured to send a location update request message of the second interface to a second Paging Coordinator (PC), wherein the request message carries the found location area information of the second interface so that the second PC can update existing location area information of the second interface;
- a fourth information module, configured to send location update result information of the second interface to a first PC after receiving a location update response message of the second interface and a fifth information module, configured to update the first interface and the second interface of the multimode terminal after either the location update request message of the first interface or the location update request message of the second interface is received.

13. The information server according to claim 12, wherein:
the information server is a Multi-Radio Power conservation Management enabled Information Server (MRPM IS).

14. The information server according to claim 12, further comprising:
a timing module, configured to set a time limit after the location update request message of the second interface is sent to the second PC.

* * * * *